Aug. 15, 1967     G. B. SHEW     3,335,821
SELF-ENERGIZING DISC BRAKE ASSEMBLY
Filed June 27, 1966     3 Sheets-Sheet 1
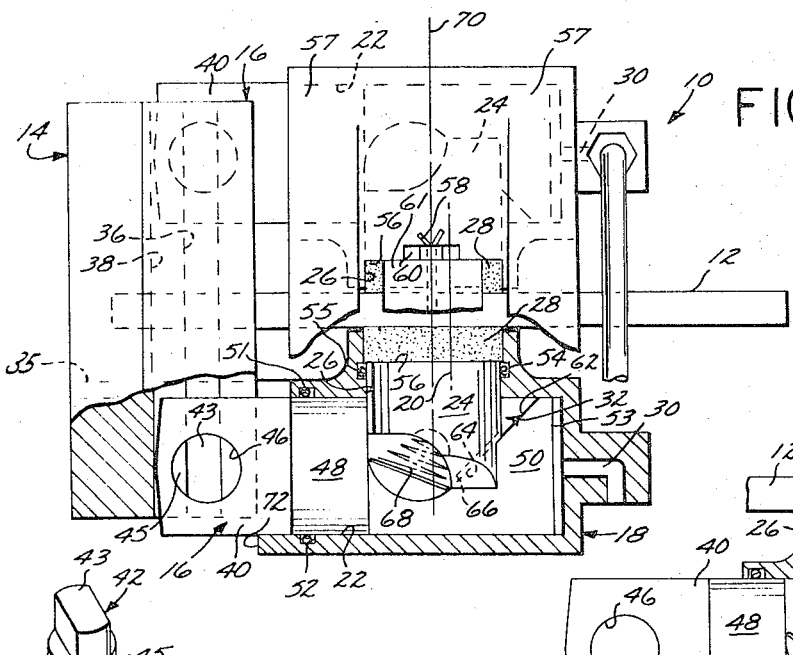
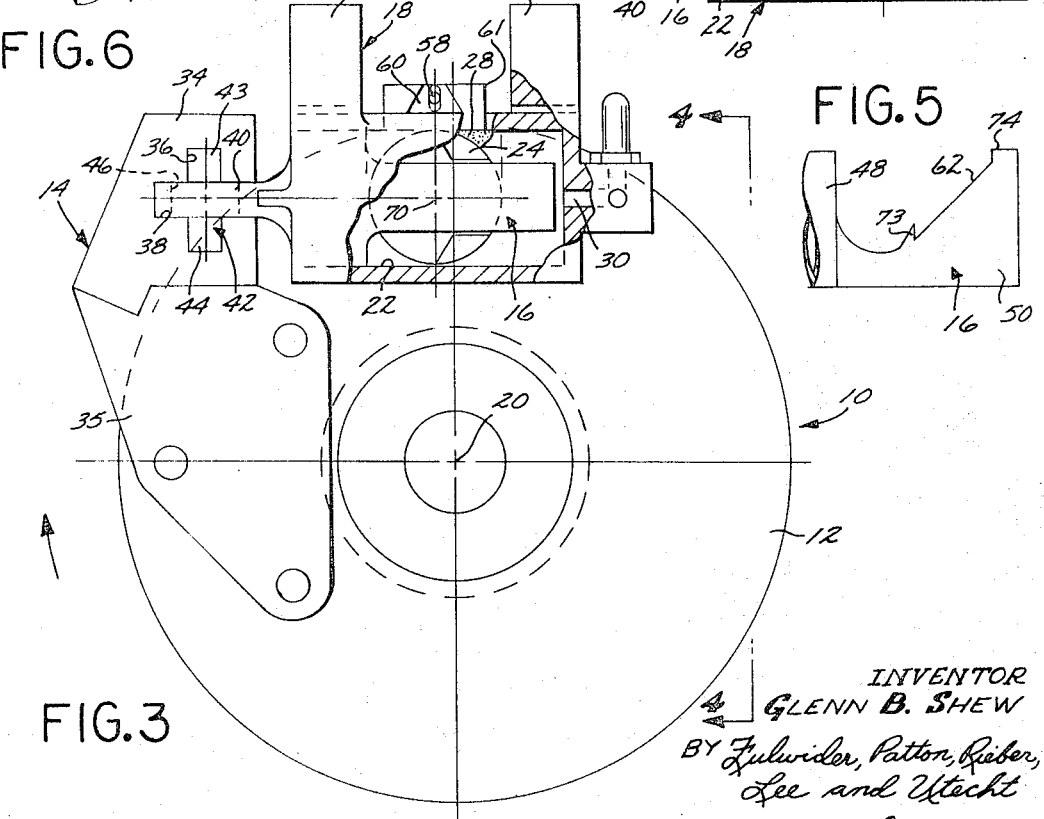
INVENTOR
GLENN B. SHEW
BY Fulwider, Patton, Rieber,
Lee and Utecht
ATTORNEYS

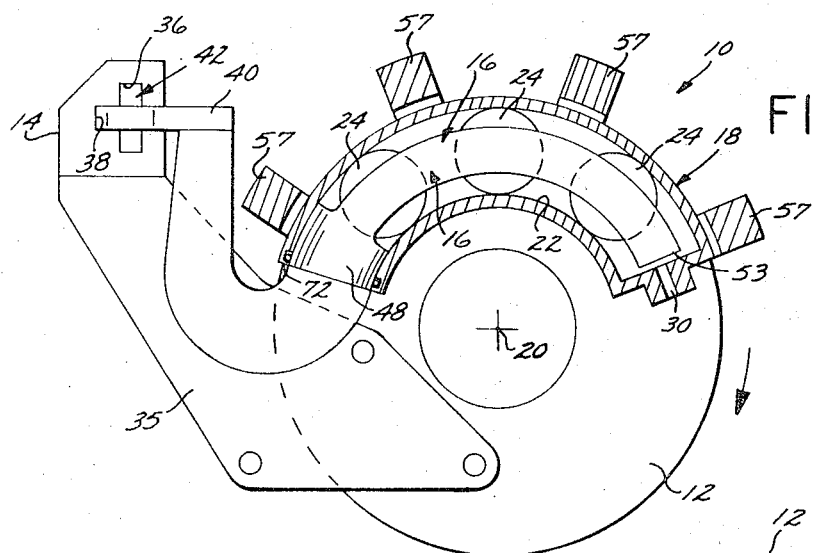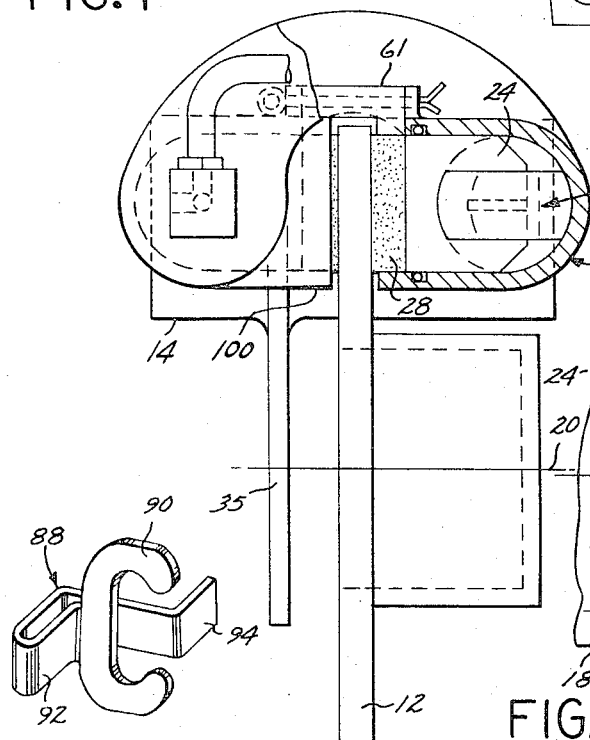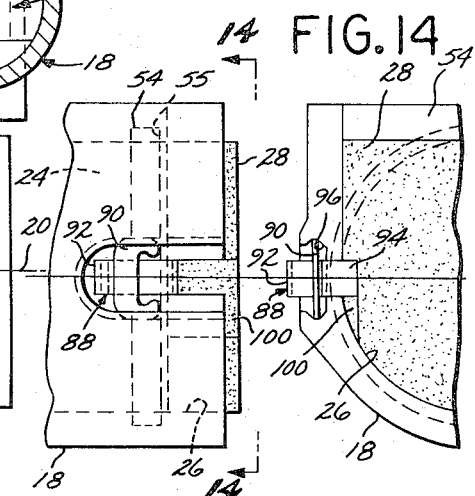

United States Patent Office 3,335,821
Patented Aug. 15, 1967

3,335,821
SELF-ENERGIZING DISC BRAKE ASSEMBLY
Glenn B. Shew, 3562 Lewis Ave.,
Long Beach, Calif. 90807
Filed June 27, 1966, Ser. No. 560,698
13 Claims. (Cl. 188—73)

The present invention relates to disc brakes and more particularly to an improved "self-energizing" disc brake assembly.

Basically, "self-energizing" disc brakes include a rotatable disc and a pair of pads supported by a stationary carrier on opposite sides of the disc. The pads are movable toward and engage the disc in response to operation of thrust producing devices to apply the brake. In contact with the rotating disc, the pads tend to move therewith in a manner such that the thrust devices increase the pressure exerted by the pads on the disc to halt rotation thereof. Although simple in concept, self-energizing disc brakes, and particularly the thrust devices thereof, have heretofore been complex in design and operation, expensive to manufacture, and difficult to service.

It is therefore an object of the present invention to provide an improved self-energizing disc brake assembly which is simple in design and operation, and which is inexpensive to manufacture.

Another object of the present invention is to provide an improved self-energizing disc brake assembly which is easy to service and highly reliable in its operation.

A further object of the present invention is to provide disc brake assemblies of the foregoing character which include simple thrust producing devices.

The foregoing as well as other objects and advantages of the present invention may be more clearly understood by reference to the following detailed description when taken with the drawings which, by way of example only, illustrate different forms of self-energizing disc brake assemblies embodying the features of the present invention.

In the drawings:

FIGURE 1 is a partially sectioned top view of one form of the self-energizing disc brake assembly;

FIGURE 2 is a fragmentary sectional top view of a portion of the self-energizing disc brake assembly of FIGURE 1, illustrating the position of the movable parts thereof when the brake material forming one of the pads has been exhausted;

FIGURE 3 is a partially sectioned side view of the self-energizing disc brake assembly of FIGURE 1;

FIGURE 4 is a partially sectioned end view of the self-energizing disc brake assembly taken along the line 4—4 of FIGURE 3;

FIGURE 5 is a fragmentary top view of the end portion of one form of slide member for use in the self-energizing disc brake assembly of FIGURE 1;

FIGURE 6 is a perspective view of a slide bearing included in the brake assemblies of the present invention;

FIGURE 7 is a partially sectioned side view of a brake assembly including a plurality of self-energizing brake units;

FIGURE 8 is a fragmentary sectional top view of an alternate form of the self-energizing disc brake assembly including a lever arm;

FIGURE 12 is a perspective view of a return spring for use in the brake assembly; and FIGURES 13 and 14 are fragmentary side and end views showing the mounting for the return spring in the brake assembly.

Figures 9, 10:
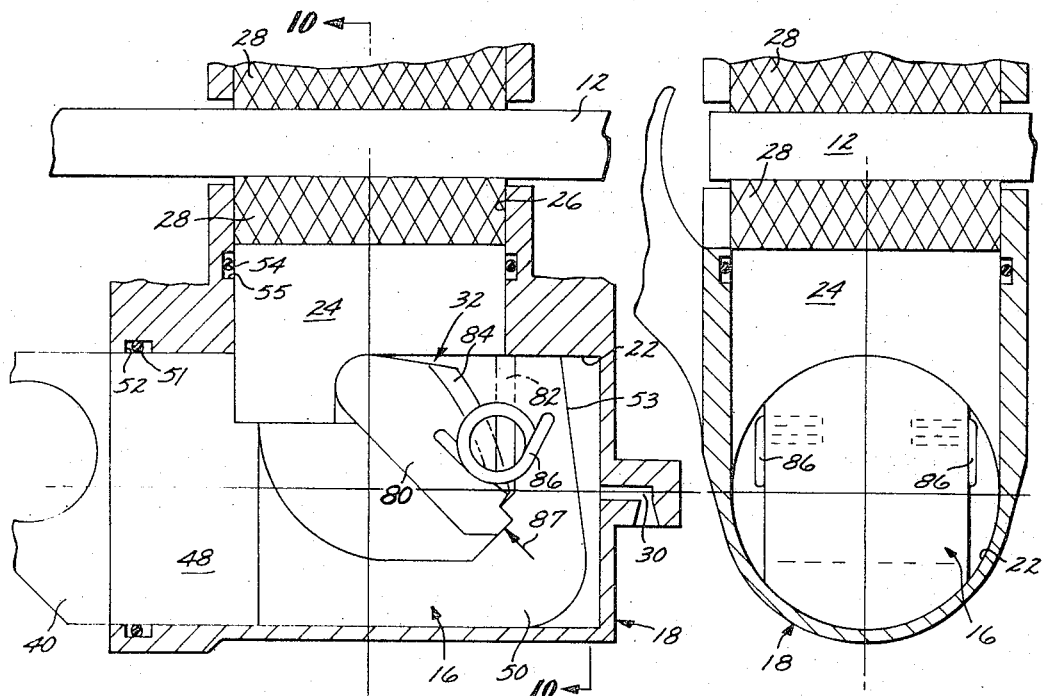
FIGURE 9 is a fragmentary sectional top view of another form of the self-energizing disc brake assembly, also including a lever arm.
FIGURE 10 is a fragmentary sectional end view taken along the line 10—10 in FIGURE 9.

Generally speaking, the self-energizing disc brake assembly is represented by the numeral 10 and comprises a disc 12, a stationary support frame 14, a pair of slide members 16, and a movable housing 18. The disc 12 is connected to a wheel (not shown) for rotation about a central axis 20 while the stationary frame 14 extends on opposite sides of the disc and is secured to a stationary support (also not shown) adjacent the wheel. The slide members 16 extend forward from the frame 14 on opposite sides of and parallel to the disc 12 and are slidably received by cylinders 22 in the movable housing 18. Also in the housing 18 are a pair of pistons 24. The pistons 24 are stationed within side bores 26 leading from the cylinders 22 normal to the disc 12 and are adapted to press pads 28 of brake material against the disc to halt its rotation.

In operation, fluid, under pressure, is introduced into the cylinders 22 through inlet ports 30 remote from the frame 14. The fluid simultaneously exerts forces on the inner walls of the cylinder 22, the ends of the slide members 16, and on the ends of the pistons 24. This causes the pistons 24 to force the pads 28 against the disc 12 and urges the movable housing 18 forward along the slide members 16 away from the frame 14. As the pads 28 press against the disc, they tend to be carried therewith away from the frame 14, further tending to move the housing 18 forward along the slide members 16. As this occurs, self-energizing means, represented generally by the numeral 32, exert additional forces on the pistons 24 which increase the friction forces of the pads 28 on the disc 12 to halt rotation of the disc and the wheel connected thereto.

Referring more specifically to FIGURES 1 and 3, the stationary support frame 14 preferably includes a bridge 34 and a mounting plate 35. The bridge 34 extends longitudinally over and on either side of the disc 12 while the mounting plate 35 extends from the bottom of the bridge on one side of the disc for connection to stationary means (not shown). The bridge 34 includes intersecting, vertical and horizontal slots 36 and 38 extending the length of the bridge. The horizontal slot opens to the front of the bridge and is adapted to receive flat, horizontal end portions 40 of the slide members 16.

The flat ends 40 of the slide member 16 are slidable along the horizontal slot 38 and are retained therein by slide bearings 42, most clearly illustrated in FIGURES 3 and 6. As represented, the slide bearings 42 include generally rectangular upper and lower ends 43 and 44 for seating within and sliding along the upper and lower ends of the vertical slot 36, and circular central portions 45 located within vertical holes 46 in the end portions 40 of the slide member 16. Thus arranged, the slide bearings 42 permit the slide members 16 to move in and out along the slots 36 and 38 and to turn about the circular portions 45 toward and away from the disc 12 to automatically align themselves along a cord of and parallel to the disc 12 with operation of the brake assembly 10. This assures that uniform forces are exerted across the surfaces of the pads 28 against the disc 12 and that the pads will wear evenly during operation of the brake assembly.

In addition to the flat horizontal end portions 40, each slide member 16 includes a central piston portion 48 and a generally flat rod portion 50 of reduced cross-sectional area. The piston portions 48 are adapted to slide within the open ends of the cylinders 22 such that the housing 18 is movable along the slide members 16 toward and away from the frame 14. A fluid-tight seal is provided between each piston portion 48 and its associated cylinder 22 by an O-ring or other seal 51 seated within an annular recess 52 in the inner wall of the cylinder 22 around the piston portion. The rod portions 50 extend forward from the piston portions 48 with ends 53 facing the fluid inlet ports 30 and adapted for sliding movement within the closed ends of the cylinders 22 beyond the side bores 26. This provides support for the closed ends of the cylinders and insures linear movement of the housing 18 along the slide members 16.

As previously indicated, the pistons 24 are supported for sliding movement within the side bores 26 toward the disc 12. During such movement a fluid-tight seal is provided between the pistons 24 and the side walls of the bores 26 by O-rings or other seals 54 seated in recesses 55 in the inner walls of the bores 26 around the pistons 24. Also during movement of the pistons, the outer faces thereof parallel the disc 12 and engage and press against the generally circular pads 28 of brake material. The pads 28 extend vertically into top holes 56 in the housing 18, between generally C-shaped, cylinder connecting and transverse force carrying arms 57, and are held in place by a cotter key 58 passing through upwardly extending flanges 60 on the right and left sides of the top holes and a retainer or cap 61 between the flanges. Thus arranged, the pads 28 may be rapidly removed for inspection or servicing simply by removing the key 58 and retainer 61 and lifting the pads from the top holes. By the same token, it is a simple matter to replace worn pads with new pads.

While the flat outer faces of the pistons 24 are adapted to press against the pads 28, the inner ends are adapted to ride over the rod portions 50 of the slide members 16 and comprise portions of the self-energizing means 32 for the brake assembly 10. In particular, in the form of the brake assemblies illustrated in FIGURES 1 through 7, the self-energizing means 32 take the forms of wedge devices comprising sloping sides 62 of the rod portions 50 and similarly sloping portions 64 of the ends of the pistons 24. The sloping sides 62 face the side bores 26 and slope forward toward the disc. The sloping end portions 64, on the other hand, ride along the sloping sides 62 toward the disc 12 to wedge the pistons 24 against the slide members 16 and the pads 28 against the disc as the housing 18 moves along the slide members away from the frame 14. Preferably, the sloping end portions 64 include fluid receiving grooves 66 to provide lubrication for the sloping sides 62. Fluid in the grooves also exerts forces on the portions 64 of the pistons 24 toward the disc 12 as do coil springs 68 between the rod portions 50 adjacent the piston portions 48 and the inner ends of the pistons. The springs 68 are light springs and maintain the pistons 24 in positions along the rod portions 50 adjacent the disc 12 when the brake is not being used. In this regard, the same result may be achieved by placing the springs 68 between the ends 53 of the rod portions 50 and the opposite inner faces of the cylinders 22.

In operation, and to halt the clockwise turning of the disc 12, fluid under pressure is introduced into the forward closed ends of the cylinders 22 through the inlet ports 30. The fluid exerts forces on the ends 53 of the rod portions 50, the piston portions 48, the inner ends of the pistons 24, and on the inner walls of the cylinders 22. The forces acting on the inner ends of the pistons 24 force the pads 28 against the rotating disc 12. The forces on the ends of the piston portions 48 and on the inner walls of the cylinder 22 tend to move the housing 18 forward along the slide members 16 away from the stationary frame 14.

As the pads 28 press against the disc 12, they tend to be carried therewith in a clockwise direction. In this regard, it should be noted that the pistons 24, side bores 26, and pads 28 are coaxial and that the central axis 70 thereof is initially above and slightly to the rear of the central axis 20 of the disc 12. The rotating disc 12 thus exerts slightly upward and forward forces on the pads 28 which are carried by the support frame 14, slide bearings 42 and slide members 16, and are transmitted to the movable housing 18 and to the pistons 24. These forces, together with the forces exerted in the inner walls of the cylinders 22, tend to move the housing 18 forward along the slide members 16 away from the stationary frame 14. As this occurs, the sloping end portions 64 of the pistons 24 ride along the sloping sides 62 of the rod portions 50. This causes the pistons 24 to be wedged tightly against the sloping sides 62 and to press more firmly against the pads 28, further increasing the friction forces of the pads on the rotating disc and halting rotation of the disc and the wheel connected thereto.

When the disc 12 is stopped, the pressure exerted upon the fluid is terminated. The drop in fluid pressure causes the pressure of the pads 28 against the disc 12 to be immediately reduced. Under the influence of the springs 68, the pads remain in light contact with the disc which may again be rotated in either a clockwise or counterclockwise direction. It is to be noted that during counterclockwise turning of the disc 12, the self-energizing features of the brake assembly 10 do not come into operation. In fact, the brake halts the rotation of the disc 12 in response to fluid pressure in the cylinders 22 tending to move the pistons upwardly along the sloping sides 62 toward the disc and the movable housing 18 away from the frame 14. In this respect, the cylinders 22 and slide 16 must be constructed such that the force due to hydraulic pressure moving the housing to the right is greater than the brake friction moving the house to the left.

With repeated use, the brake material comprising the pads 28 wears and the thickness of the pads is reduced. As this occurs, the central axis 70 of the cylinders 24 moves toward the central axis 20 of the disc 12 and eventually forward of the axis 20 when the brake material is completely exhausted (see FIGURE 2). As this occurs, the housing 18 travels along the slide member 16 between the positions illustrated in FIGURE 1 and FIGURE 2. In this regard, the edges 72 of the movable housing 18 adjacent the open end receiving the slide members 16 may be utilized as a gauge or measure of the thickness of the pads 28 within the brake assembly 10. The slide members 16 may include markings which are successively exposed by the edges 72 as the housing 18 travels along the slide members. Before the pads 28 are completely worn, the edges 72 may pass warning indications allowing the operator of the vehicle or its mechanic to readily detect the need for a replacement of the brake pads without removing the wheels of the vehicle.

To insure that the outer face of the pistons 24 never contact the disc 12 with wear of the pads 28 a further indication of brake wear may be incorporated into the assembly 10. In particular, the sloping sides 62 may include a pair of shoulders for limiting the travel of the pistons 24 therealong. The shoulders are illustrated in FIGURE 5 and represented by the numerals 73 and 74. The shoulder 73 acts as a reference stop for determining the initial position of a piston 24 prior to operation of the brake assembly. The shoulder 74 acts as a stop to limit sliding movement of the piston along the side 62 to remove the self-energizing features of the brake when the piston contacts the stop. The hard braking thereafter required to halt the disc 12 is a warning of pad wear.

The brake assembly 10 just described includes a pair of pistons 24, one on either side of the disc 12. The same principles of construction and operation, however, may be applied to a multiple unit brake assembly having straight or curved slide members 16. Such an arrangement is represented in FIGURE 7 as including three pairs of pistons spaced along arcuate slide members 16 within side bores in arcuate cylinders 22 in the movable housing 18.

The structural details and operation of the multiple unit assembly is substantially the same at each unit and is as previously described in connection with FIG-URES 1–6. Thus, in response to fluid under pressure introduced through the inlet ports 30 in the end of the cylinders 22, the pads 28 are pressed against the disc 12 and the pistons 24 wedged against the inclined sides 62 of the slide members 16 to produce a rapid and immediate halting of the clockwise rotation of the disc. As with the basic brake assembly, the multiple piston brake assembly is easy to install, is self-aligning, and easy to service and maintain simply by removing and reinserting new pads 28 as old pads become worn. In this regard, the wearing of the pads, which may be single arcuate pads or separate circular pads, may be continuously monitored simply by noting the position of the edges 72 of the cylinders 22 along the slide members 16.

An alternate form of the brake assembly 10, which also may be utilized in a single or multiple unit setting, incorporates a lever arm configuration rather than a wedge device as the self-energizing means 32 and is illustrated in FIGURE 8. In the embodiment illustrated in FIGURE 8, the rod portion 50 of the slide member 16 is of a generally semicircular cross section and includes a generally triangular slot 76 facing the disc 12. The inner end of the piston 24 also includes a triangular recess 78 which is a mirror image of the recess 76. Within the recesses 76 and 78 are supported opposite ends of a lever arm 80. The lever arm 80 transforms the forward sliding movement of the housing 18 along the slide member 16 into an outward force on the piston 24 toward the disc 12 to firmly press the pad 28 against the disc to halt the rotation thereof.

In particular, when fluid, under pressure, is introduced into the cylinder 22, it exerts an outward force on the piston 24 to urge the pad 28 into contact with the rotating disc 12. The pad tends to move with the rotating disc and exerts a forward force on the housing 18 along the slide member 16. This in turn causes the lever arm 80 to rotate in a clockwise direction and to press outwardly on the piston 24 which then exerts additional forces on the pad 28 against the disc 12, halting rotation of the disc. In this manner, the action of the lever arm 80 is self-energizing in response to rotation of the disc 12 in contact with the pad 28. As in the wedge form of self-energizing means 32, the operation of the lever arm 80 is assisted by the fluid pressures acting on the inner walls of the cylinder 20 urging the movable housing 18 forward along the slide member 16.

Figure 11:
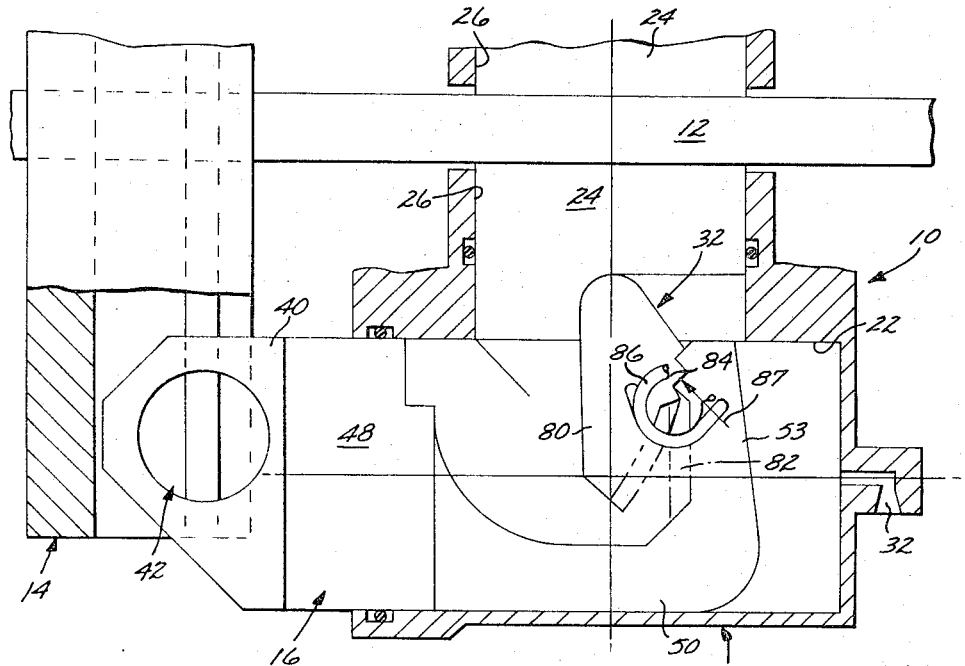
FIGURE 11 is a fragmentary sectional top view similar to FIGURE 9, illustrating the position of the moving parts of the assembly when the brake material comprising the pads thereof has been exhausted.

In the embodiment illustrated in FIGURE 8, as the brake material comprising the pad 28 becomes worn, the thickness reduces, and the lever arm 80 becomes more perpendicular to the disc 12. As this occurs, the mechanical advantage of the lever arm changes. In FIGURES 9 through 11, a form of the brake assembly 10 including a lever arm 80 having a constant mechanical advantage is illustrated.

In particular, the form of the self-energizing means 32 in FIGURES 9 through 11 differs from that illustrated in FIGURE 8 in that the side of the rod portion 50 facing the side bore 26 is cut away and a rack 82 formed therein. The rack 82 faces in the general direction of the piston portion 48 and stationary frame 14 and extends toward the disc 12. In addition, the lever arm 80 includes a pinion portion 84 facing the rack 82. The pinion 84 is adapted to mesh with the rack 82 and to effectively climb therealong toward the disc 12 from the inclined position illustrated in FIGURE 9 to the generally vertical position illustrated in FIGURE 11 as the material comprising the pad 28 is worn and as the housing 18 is moved forward along the slide member 16.

In the illustrated form, the pinion 84 is maintained in contact with the rack 82 and the lever arm 80 continuously urged in a clockwise direction (when viewed in FIGURES 9 and 11) to force the piston 24 toward the disc 12. In the illustrated form, this is accomplished by a pair of coil springs 86 connected to the sides of the rack 82 and to opposite sides of the lever arm 80. However, alternate means may be employed to maintain the pinion 84 in contact with the rack 82. For example, one of the elements of the rack and pinion may be magnetized and the other formed of a magnetic material.

In operation, the lever arm 80 always exerts a force on the piston 24 along the direction of the arrow 87 illustrated in FIGURE 9. As fluid, under pressure, is introduced into the cylinder 22, forces are exerted on the piston 24 causing the piston to urge the pad 28 against the rotating disc 12. Simultaneously, forces acting on the inner walls of the cylinder 22 tend to urge the cylinder forward along the slide member 16. This tends to rotate the lever arm in a clockwise direction causing the pinion 84 to effectively climb the rack 82 and exert additional forces on the piston 24 towards the disc 12. In addition, as the disc 12 rotates in contact with the pad 28, the pad tends to follow the rotation of the disc and exerts forces on the housing 18 forward along the slide member 16. This further increases the clockwise rotational forces on the lever arm 80 tending to cause the lever arm to climb further along the rack 82 toward the disc and exert greater forces on the piston 24 against the pad 28 and hence on the disc 12, causing the disc to stop. It should be noted that the pinion 84 and rack 82 are shaped such that as the pinion climbs the rack, the direction of the forces exerted by the lever arm 80 on the piston 24 remains substantially the same. Therefore the mechanical advantage of the lever arm acting on the piston remains unchanged.

After the disc 12 has stopped, the fluid pressure may be reduced, causing the forces on the pads against the disc 12 to decrease and allowing the disc 12 to once again rotate within the brake assembly 10.

In this respect, the spring 86 continues to exert a light force on the piston 24, maintaining the pad 28 lightly against the disc 12. In order to move the pad away from the disc when fluid presure is reduced, return springs, such as 88, may be included in the brake assembly 10. An exemplary form of one such return spring 88 is illustrated in FIGURE 12 and shown mounted in the brake assembly in FIGURES 13 and 14.

As represented, the spring 88 is a bent piece of flat metal stock including a flat, generally C-shaped ear portion 90, a loop portion 92, and a finger portion 94. The loop portion 92 extends outward from and normal to one side of the ear portion 90 and then bends back to an opposite side of the ear portion. There the loop portion 92 terminates in the finger portion 94 which is also substantially normal to the ear portion.

When mounted within the brake assembly 10, top and bottom edges of the ear portion 90 fit into channelled upper and lower sides of a vertical recess 96 in the side of the housing 18 while the finger portion 94 extends through an open base 98 of the recess into the side bore 26. Thus positioned, the finger portion 94 fits into a slot 100 in the pad 28 and bears against the pad.

In operation, the return spring 88 overcomes the inner spring forces presented by the spring 86 and moves the pad 28 away from the disc 12 when fluid pressure is removed from the brake assembly 10. The friction of the return spring 88 against the housing 18 is sufficient to hold the sprng in place during the stroke moving the pad 28 away from the disc, yet the spring will slide along the groove 96 as the material of the pad wears with operation of the brake assembly.

From the foregoing description, it is appreciated that the present invention provides a self-energizing brake assembly which is simple in design and operation. Furthermore, the brake assembly is easy to mount and to service, and provides a continuous indication of the amount of wear of the brake pads included within the assembly.

While particular forms of self-energizing brake assemblies have been described in some detail herein, changes and modifications may be made in the illustrated forms without departing from the spirit of this invention. It is therefore intended that the present invention be limited in scope only by the terms of the following claims.

I claim:
1. A disc brake assembly, comprising:
   a rotatable disc;
   a stationary support frame;
   a slide member extending from said frame substantially parallel to said disc;
   a housing movable along said side member and including a cavity having an open end for slidably receiving an end of said slide member, a fluid inlet port to said cavity, and a side bore spaced from said open end in fluid communication with said inlet port;
   a pad of brake material in said bore for movement toward said disc;
   a piston supported for sliding movement in said bore substantialy normal to and toward said disc to force said pad against said disc as fluid is introduced into said cavity through said inlet port;
   and means on said slide member engaging said piston for urging said piston toward said disc with movement of said housing along said slide in a predetermined direction.

2. The assembly of claim 1, wherein said housing includes an edge movable along said slide member for indicating the thickness of the pad of brake material between said piston and said disc.

3. The assembly of claim 1, wherein said disc is supported for turning in a vertical plane and including means for connecting said slide member to said support frame comprising:
   a generally vertical slot in said support frame extending longitudinally, substantially normal to said disc;
   a generally horizontal slot in said support frame opening to a front of said frame and extending longitudinally, substantially normal to said disc;
   an end portion of said slide member adapted to extend within said horizontal slot and to slide therealong toward and away from said disc, said end portion of said slide member having a substantially vertical hole therethrough;
   and a slide bearing having upper and lower end portions stationed for sliding movement within said vertical slot and a generally circular midportion for lying within said hole in said end portion of said slide member to allow said slide member to rotate about said bearing and to slide therewith toward and away from said disc whereby said slide member automatically aligns itself parallel to said disc with operation of said brake assembly.

4. The assembly of claim 1, wherein:
   said disc is supported for turning in a vertical plane and a forward turning with said pad in contact therewith develops forces on said pad tending to move said housing forward along said slide member;
   said slide member includes a piston portion for sliding along said cavity and a rod portion of reduced cross-sectional area extending forward from said piston portion;
   said means on said slide member engaging said piston includes a side of said rod portion facing said side bore and sloping forward toward said disc;
   and wherein said piston is adapted to ride along said side whereby forward movement of said housing along said slide member wedges said piston against said side and said pad against said disc.

5. The assembly of claim 4, wherein said piston includes a sloping end portion similar to said side for riding over said side.

6. The assembly of claim 5, wherein said sloping end portion includes a fluid receiving groove facing said side.

7. The assembly of claim 5, including spring means, bearing against said rod portion and said piston to continuously urge said piston toward said disc and along said side.

8. The assembly of claim 5, wherein said side includes a pair of spaced stops limiting travel of said piston therealong.

9. The assembly of claim 1, wherein said means on said slide member engaging said piston is a lever arm including a first end bearing against said piston and a second end bearing against said slide member forward of said first end whereby said lever arm forces said piston toward said disc with forward movement of said housing along said slide member.

10. The combination of claim 9, wherein:
    said disc is supported for turning in a vertical plane and a forward turning with said pad in contact therewith develops forces on said pad tending to move said housing forward along said slide member;
    said slide member includes a piston portion for sliding along said cavity and a rod portion of reduced cross-sectional area extending forward from said piston portion and including a rack facing said piston portion and extending toward said disc;
    and wherein said second end of said lever arm includes a pinion for engaging and effectively climbing said rack toward said disc with forward movement of said housing along said slide member.

11. The combination of claim 10, including means for retaining said pinion in contact with said rack.

12. The assembly of claim 1 including spring means in said housing continuously urging said piston outwardly in said side bore.

13. The assembly of claim 12 including return spring means for overcoming said spring means to move said pad away from said disc when fluid pressure in said cavity is reduced.

References Cited
UNITED STATES PATENTS

| 3,185,258 | 5/1965 | Douglas | 188—73 |
| 3,194,349 | 7/1965 | Kershner et al. | 188—73 |

MILTON BUCHLER, *Primary Examiner.*

G. E. HALVOSA, *Assistant Examiner.*